US009216741B2

(12) United States Patent
Tinker et al.

(10) Patent No.: US 9,216,741 B2
(45) Date of Patent: Dec. 22, 2015

(54) LOCK UP CLUTCH CONTROLS—HIGH IDLE SET POINT

(71) Applicant: Caterpillar Inc., Peoria, IL (US)

(72) Inventors: Matthew Tinker, Peoria, IL (US); Guillaume Raffin, Saint Nizier du Moucherotte (FR); John T. Reedy, Peoria, IL (US); Don B. Benckendorf, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 58 days.

(21) Appl. No.: 14/154,855

(22) Filed: Jan. 14, 2014

(65) Prior Publication Data

US 2015/0197251 A1   Jul. 16, 2015

(51) Int. Cl.
*B60W 10/02* (2006.01)
*B60W 10/06* (2006.01)
*B60W 30/20* (2006.01)

(52) U.S. Cl.
CPC ............. *B60W 30/20* (2013.01); *B60W 10/026* (2013.01); *B60W 10/06* (2013.01); *B60W 2030/203* (2013.01)

(58) Field of Classification Search
CPC ... B60W 10/026; B60W 10/06; B60W 30/20; B60W 2030/203
USPC ................................................. 477/181, 169
See application file for complete search history.

(56) References Cited

U.S. PATENT DOCUMENTS

| 4,716,999 | A  | * | 1/1988 | Tezuka et al. ............... 192/3.29 |
| 5,105,926 | A  |   | 4/1992 | Yoshimura et al. |
| 5,583,766 | A  |   | 12/1996 | Birchenough et al. |
| 5,865,709 | A  |   | 2/1999 | Tamura et al. |
| 5,879,266 | A  |   | 3/1999 | Sawamura et al. |
| 6,449,550 | B1 | * | 9/2002 | Lutz et al. ..................... 701/67 |
| 6,939,265 | B2 | * | 9/2005 | Rustige et al. ................ 477/84 |
| 7,044,885 | B2 |   | 5/2006 | Doering |
| 7,130,732 | B2 |   | 10/2006 | Sporl et al. |
| 8,296,028 | B2 | * | 10/2012 | Matsunaga et al. ........... 701/67 |
| 2002/0038174 | A1 |   | 3/2002 | Koumura et al. |
| 2002/0091477 | A1 |   | 7/2002 | Hagiwara et al. |
| 2005/0222737 | A1 |   | 10/2005 | Imamura et al. |
| 2010/0036574 | A1 | * | 2/2010 | Hopp ............................. 701/68 |
| 2010/0262346 | A1 |   | 10/2010 | Matsunaga et al. |
| 2011/0174585 | A1 | * | 7/2011 | Kleila et al. ................ 192/3.28 |

* cited by examiner

*Primary Examiner* — Sherry Estremsky
(74) *Attorney, Agent, or Firm* — Baker & Hostetler LLP; Jeff A. Greene

(57) ABSTRACT

An engine control system is provided where the engine control system includes a torque converter, an engine connected to the torque converter, a transmission connected to the torque converter, a lock-up clutch housed in the torque converter wherein the lock-up clutch is configured to mechanically connect the engine and the transmission when the lock-up clutch is engaged, an engine speed sensor configured to obtain a prior engine speed which is measured prior to engagement of the lock-up clutch, a transmission speed sensor configured to obtain a prior transmission speed which is measured prior to the engagement of the lock-up clutch, and an engine control module configured to determine a desired engine speed at a speed lower than the prior engine speed and adjust a speed of the engine to the desired engine speed just prior to the movement of the lock-up clutch for the engagement or as the lock-up clutch moves toward the engagement.

20 Claims, 5 Drawing Sheets

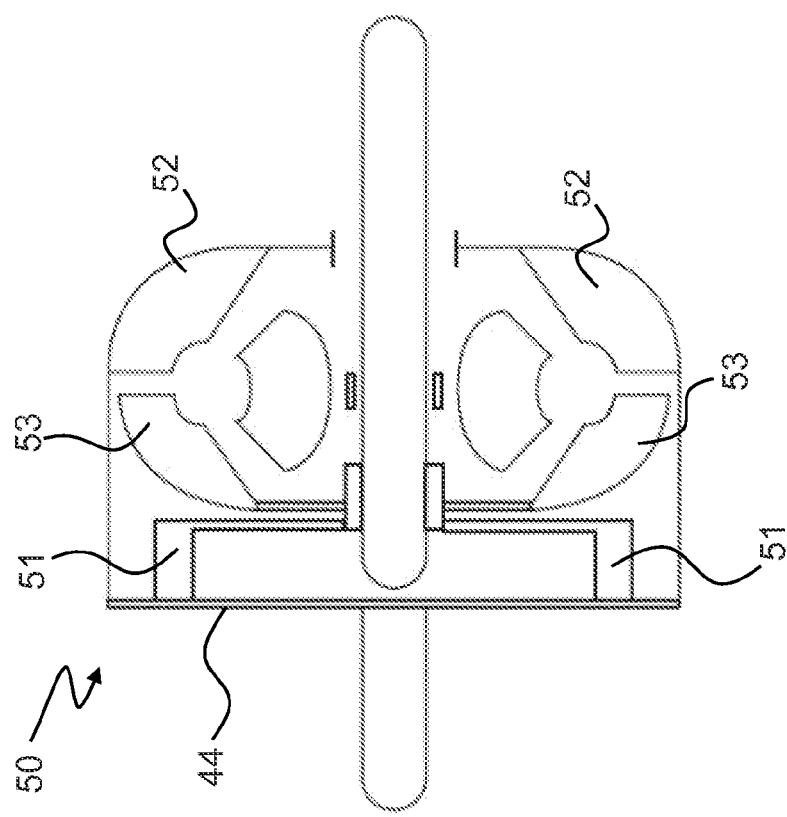
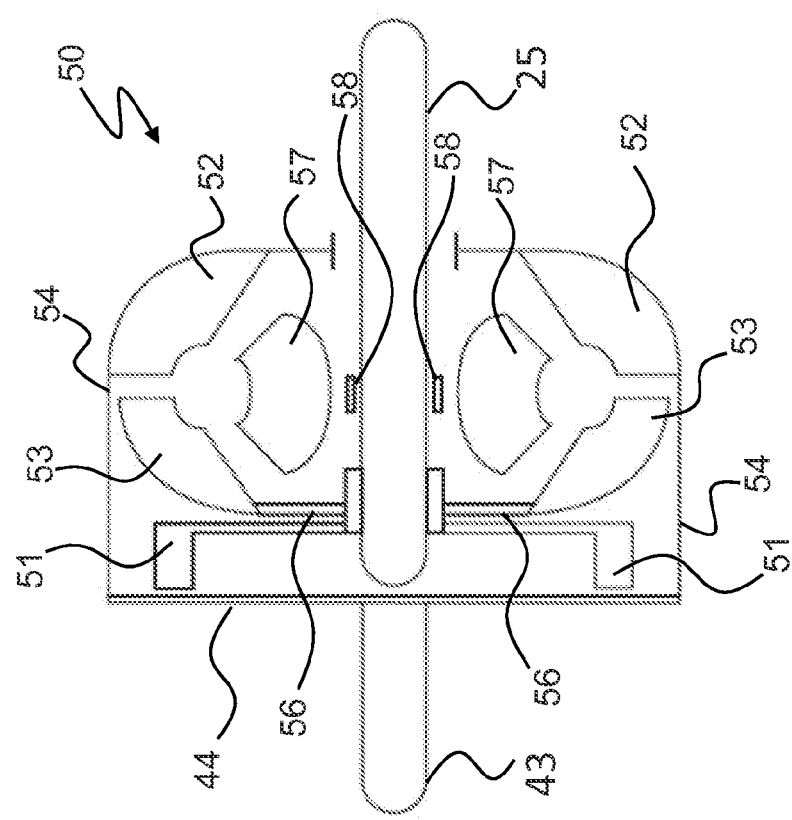

LOCK UP CLUTCH CONTROLS—HIGH IDLE SET POINT

TECHNICAL FIELD

This disclosure relates generally to an integrated engine and transmission control and more specifically, to a system which regulates a lock-up clutch to mechanically lock the engine to the transmission.

BACKGROUND

A traditional fluid-filled power transmitting device is equipped with a lock-up clutch to improve the power transmitting efficiency during operation of the device. For example, the lock-up clutch is fully engaged or disengaged, depending on an operating condition of the device. To control the lock-up clutch, a lock-up clutch controller has been employed. An example of such a controller is disclosed in U.S. Pat. No. 5,865,709 (hereafter "the '709 patent"), entitled "Apparatus for controlling vehicle lock-up clutch, wherein engine output is reduced upon releasing action of lock-up clutch." The '709 patent is directed towards providing an apparatus to reduce a releasing shock of a motor vehicle when the lock-up clutch of the motor vehicle is switched from a fully engaged state to a fully released state.

However, a rough shift of power transmission or a shift with unacceptable acceleration can also be experienced in the fluid-filled power transmitting device when the lock-up clutch of the device is switched from a fully released state to a fully engaged state. During the engagement of the lock-up clutch, the torque transmitted from the engine to the transmission through the lock-up clutch causes rapid acceleration of a machine equipped with the device. Such a sudden acceleration can cause loss of precise machine control or degradation of driving comfortableness of the driver.

SUMMARY

Accordingly, it would be desirable to have a device that addresses some of the issues occurring during the lock-up clutch engagement as described above.

In accordance with one aspect of the disclosure, an engine control system is provided where the engine control system includes a torque converter, an engine operatively connected to the torque converter, a transmission operatively connected to the torque converter, a lock-up clutch housed in the torque converter where the lock-up clutch is configured to mechanically connect the engine and the transmission when the lock-up clutch is engaged, an engine speed sensor configured to obtain a prior engine speed which is measured prior to the engagement of the lock-up clutch, a transmission speed sensor configured to obtain a prior transmission speed which is measured prior to the engagement of the lock-up clutch, and an engine control module. The engine control module is configured to determine a desired engine speed at a speed lower than the prior engine speed and to adjust a speed of the engine to the desired engine speed at least one of just prior to the movement of the lock-up clutch and as the lock-up clutch moves toward the engagement.

The engine control module is further configured to incrementally lower a speed of the engine to the desired engine speed and adaptively adjust an amount of incremental speed change of the engine as a function of a difference between the prior transmission speed and the prior engine speed. The amount of the incremental speed change is in a range of about 1% to about 50% of the difference between the prior transmission speed and the prior engine speed. The desired engine speed is equal to or higher than the prior transmission speed but lower than the prior engine speed.

Optionally, the engine control module is further configured to determine the desired engine speed as a function of increase in efficiency of the torque converter due to the lock-up clutch engagement where the torque converter efficiency is defined by any of a speed ratio between a transmission speed and an engine speed, a torque ratio between the transmission and the engine, and a product of the speed ratio and the torque ratio and where a value of the torque converter efficiency prior to the lock-up clutch engagement is lower than a value of the torque converter efficiency after the lock-up clutch engagement. The lock-up clutch is configured to increase the torque converter efficiency up to 100% when the lock-up clutch is engaged.

The engine control module is further configured to determine the desired engine speed at a speed which is lower than the prior engine speed in an amount proportional to a projected increase in torque converter efficiency due to the lock-up clutch engagement. Optionally, the engine control module is further configured to activate a lock-up engagement command, determine a transition time to complete the lock-up clutch engagement and complete the lock-up clutch engagement for the transition time while adjusting a speed of the engine to the desired engine speed. The transition time for completing the lock-up engagement is in a range of from about $1/100$ sec. to about $1/5$ sec.

In accordance with another aspect of the disclosure, a method for connecting an engine and a transmission via a lock-up clutch in an engine control system is provided. The method includes operatively connecting the engine to a torque converter, operatively connecting the transmission to the torque converter, housing the lock-up clutch in the torque converter, configuring the lock-up clutch to mechanically connect the engine and the transmission when the lock-up clutch is engaged, measuring a prior engine speed of the engine, via an engine speed sensor, prior to the engagement of the lock-up clutch, configuring an engine control module to determine a desired engine speed at a speed lower than the prior engine speed, and adjust a speed of the engine to the desired engine speed at least one of just prior to the movement of the lock-up clutch and as the lock-up clutch moves toward the engagement.

In accordance with another aspect of the disclosure, an apparatus is provided, the apparatus including a torque converter, an engine operatively connected to the torque converter, a transmission operatively connected to the torque converter, a lock-up clutch housed in the torque converter, means for configuring the lock-up clutch to mechanically connect the engine and the transmission when the lock-up clutch is engaged, means for obtaining a prior engine speed which is measured prior to the engagement of the lock-up clutch, means for obtaining a prior transmission speed which is measured prior to the engagement of the lock-up clutch, means for determining a desired engine speed at a speed lower than the prior engine speed, and means for adjusting a speed of the engine to the desired engine speed at least one of just prior to the movement of the lock-up clutch and as the lock-up clutch moves toward the engagement.

BRIEF DESCRIPTION OF THE FIGURES

FIG. 2A shows a cross-section view of an exemplary torque converter of the engine control system where the lock-up clutch is disengaged.

FIG. 2B shows a cross-section view of an exemplary torque converter of the engine control system where the lock-up clutch is engaged.

DETAILED DESCRIPTION OF THE DISCLOSURE

Figure 1:
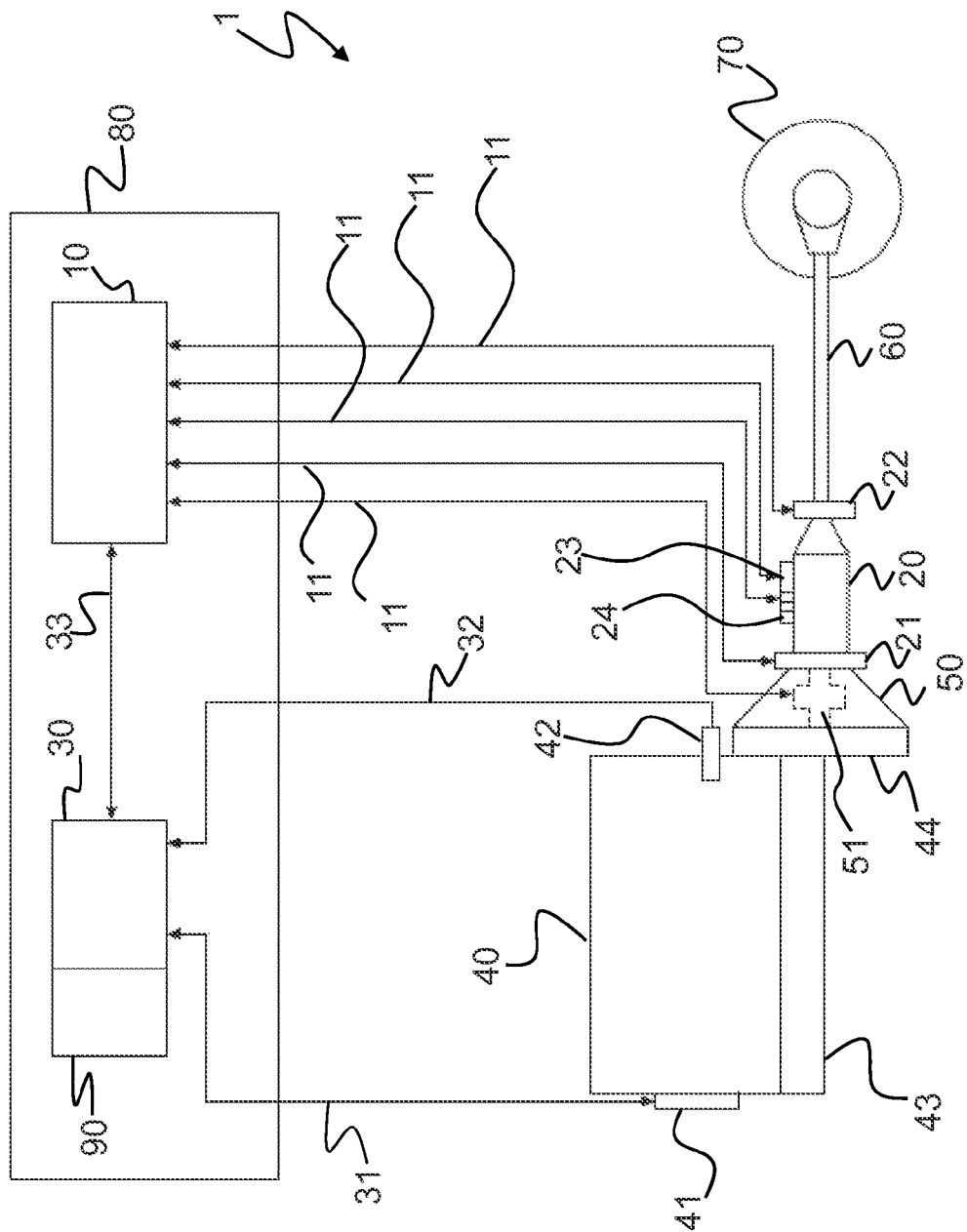
FIG. 1 shows a schematic illustration of an exemplary engine control system of the disclosure.

Referring to FIG. 1, FIG. 1 shows a schematic illustration of an exemplary engine control system 1 of the disclosure. The engine control system 1 may include an engine 40, a transmission 20 and a torque converter 50.

The engine control system 1 may further include an engine controller 30 and a transmission controller 10 which are embodied in separate or combined microprocessors adapted to communicate via an electrical or data link. Numerous commercially available microprocessors can be adapted to perform the functions of the engine controller 30 and the transmission controller 10. The input of the transmission 20 may be connected to and driven by the engine 40 through the torque converter 50 equipped with a lock-up clutch (LUC) 51. The torque converter 50 may be connected to an engine flywheel 44 and further to an engine crankshaft 43.

The transmission controller 10 may be adapted to receive inputs including an engine speed signal, and effect gear changes in the transmission 20. The engine control system 1 may be provided with a plurality of solenoids 24. A transmission input speed sensor 21 may be connected to the transmission 20 and produce a transmission input speed signal that is a function of the transmission input speed. The transmission input speed signal may be delivered to the transmission controller 10 via an electrical link 11. A transmission output speed sensor 22 may be connected to the transmission 20 and produce a transmission output speed signal that is a function of the transmission output speed. The transmission output speed signal may be delivered to the transmission controller 10 via an electrical link 11. The output of the transmission 20 may be connected to and adapted to rotatably drive a shaft 60. The shaft 60 may be in turn connected to and adapted to drive a ground engaging wheel 70, thereby propelling a machine.

The engine controller 30 may be adapted to receive operating parameters including an engine speed signal. The engine controller 30 may process the received signals to produce a fuel injection control signal for adjusting the fuel delivery to the engine 40 based on the received signals. In one aspect, the engine controller 30 may be connected, via an electrical link 31, 32 to an engine speed sensor 41 which is adapted to sense an engine speed and produce an engine speed signal, or other sensors 42. In some aspects, the engine controller 30 is capable of determining the speed, angular position and direction of rotation of a rotatable shaft.

The operation of the engine control system 1 may begin at an Electronic Control Module (ECM) 80. The ECM 80 may receive information about the operation of the engine control system 1 through a plurality of sensors 21, 22, 23, 41, 42. The ECM 80 may use the information from the plurality of sensors 21, 22, 23, 41, 42 to control the engine 40, the torque converter 50 and the transmission 20, respectively. The transmission controller 10 and the engine controller 30 may be communicatively connected to the ECM 80. In one aspect, the transmission controller 10 and the engine controller 30 may be integrated in the ECM 80. For example, the ECM 80 may control the quantity of fuel that is injected into the engine 40 per engine cycle, ignition timing, variable valve timing, and operations of other engine components. Accordingly, the ECM 80 may control or dictate the parameters by which the engine operates. These ECM 80 controls may be implemented through software instructions.

The engine control system 1 may further include an idle speed control (ISC) unit 90. The ISC unit 90 may regulate engine idle speed. The ISC unit 90 may provide stabilization of the engine when loads are applied to the engine 40. In one aspect, the ISC unit 90 may adjust the idle speed of the engine 40 under at least one or more of conditions such as a high idle, a low idle, a warm curb idle, an air conditioner idle, an electrical load, and an automatic transmission load. In some aspects, the ISC unit 90 may be controlled by the ECM 80.

FIG. 2A shows a cross-section view of an exemplary torque converter 50 of the engine control system 1 where the lock-up clutch 51 is disengaged. The torque converter 50 may include a pump impeller 52 and a turbine 53. The rotating housing 54 of the torque converter 50 may be fastened directly to an engine flywheel 44.

The pump impeller 52 may be connected to a crankshaft 43 of the engine. In one aspect, the pump impeller 52 may be integrated with the torque converter housing 54. In some aspects, the pump impeller 52 may be driven by the crankshaft 43. The fluid in the pump impeller 52 may rotate with the pump impeller 52 so that as the pump impeller speed increases, centrifugal force causes the fluid to flow outward toward the turbine 53.

The turbine 53 may be located inside the torque converter 50. In one aspect, the turbine 53 may not be connected to the torque converter housing 54. The transmission shaft 25 of the transmission 20 may be attached by the splines 56 to the turbine 53 when the torque converter 50 is mounted to the transmission 20. In some aspects, the fluid flown outward from the pump impeller 52 may be transferred to the turbine 53, thereby turning the turbine 53 in the same direction as the engine crankshaft 43.

Optionally, the torque converter 50 may further include a stator 57. The stator 57 may be located between the pump impeller 52 and the turbine 53. The stator 57 may redirect the fluid that exits the turbine 53 toward the pump impeller 52.

The torque converter 50 may also include a one-way clutch 58 for torque converter drive. The one-way clutch 58 may allow the stator 57 to rotate in the same direction as the transmission shaft 25. The torque converter 50 may use a hydraulic system that uses oil that is also common with a brake cooling system, a parking brake release system, and a body hoist system. Thus, during the torque converter drive, the torque converter 50 may drive the transmission 20 hydraulically.

The torque converter 50 may include a lock-up clutch 51 for direct drive. The lock-up clutch 51 may be implemented in the torque converter 50 to lock the engine 40 and the transmission 20. The lock-up clutch 51 may be placed in front of the turbine 53. During the direct drive, the lock-up clutch 51 may connect the engine crankshaft 43 and the transmission shaft 25 to mechanically couple the engine 40 and the transmission 20.

FIG. 2B shows a cross-section view of an exemplary torque converter 50 of the engine control system 1 where the lock-up clutch 51 is engaged. When the lock-up clutch 51 is engaged to connect the engine 40 and the transmission 20, the lock-up clutch 51 may rotate together with the pump impeller 52 and the turbine 53. In various aspects, the lock-up clutch 51 may cause the engine 40 and the transmission 20 to turn at the speed of the engine 40. When the lock-up clutch 51 is engaged, 95% or more of the power generated by the engine 40 may be transmitted to the transmission 20. In certain aspects, 100% of the power generated by the engine 40 may be transmitted to the transmission 20.

Optionally, as shown in FIG. 1, the lock-up clutch 51 may be communicably connected to the ECM 80 so that the lock-up clutch 51 can be controlled by the ECM 80. The ECM 80 may activate the lock-up clutch 51 when direct drive is necessary. When the lock-up clutch 51 is activated, the lock-up clutch 51 may be hydraulically engaged. As the lock-up clutch 51 is engaged, the lock-up clutch 51 may place the torque converter 50 in direct drive, and the full power from the engine 40 may be transmitted through the torque converter 50.

A speed of the engine 40 is normally controlled in response to a desired engine speed signal. During the lock-up clutch engagement, the transmission speed is regulated in response to the speed of the engine 40. As the lock-up clutch 51 is getting engaged, the speed of the engine 40 can be faster than the transmission speed. This speed difference will cause sudden machine acceleration when the lock-up clutch 51 moves from a disengaged position to an engaged position. Depending on the duration of the acceleration period, the operator will feel a rough shift or a shift with unacceptable acceleration. For example, when everything else being equal, such an unexpected change in machine speed can degrade the ability to maintain precise control of the machine during fine dozing applications and can lead to a poor operator perception of machine quality as well. In response to these problems, a speed of the engine is adjusted to a speed where the speed difference between the speed of the engine 40 and the transmission speed is minimized as the lock-up clutch moves toward the engagement.

In one embodiment, a speed of the engine 40 may be adjusted to a desired engine speed when the ECM 80 activates the lock-up clutch command. The desired engine speed may be a speed lower than a prior engine speed that is measured prior to the lock-up clutch engagement. In accordance to the desired engine speed, a speed of the engine 40 may be incrementally lowered to the desired engine speed without resulting in unacceptable acceleration and torque interruption as the lock-up clutch moves toward the engagement. Optionally, a speed of the engine 40 may be incrementally lowered to the desired engine speed just before the movement of the lock-up clutch for the engagement. In one aspect, the amount of the incremental change in speed of the engine 40 may be adaptively adjusted as a function of a difference between a prior transmission speed and the prior engine speed both of which have been measured prior to the lock-up clutch engagement. In some aspects, once the lock-up clutch command is turned on, the prior transmission speed and the prior engine speed may be measured prior to the mechanical movement of the lock-up clutch 51 for engagement. Optionally, the prior transmission speed and the prior engine speed may be measured during the mechanical movement of the lock-up clutch 51 for engagement.

Figure 3:
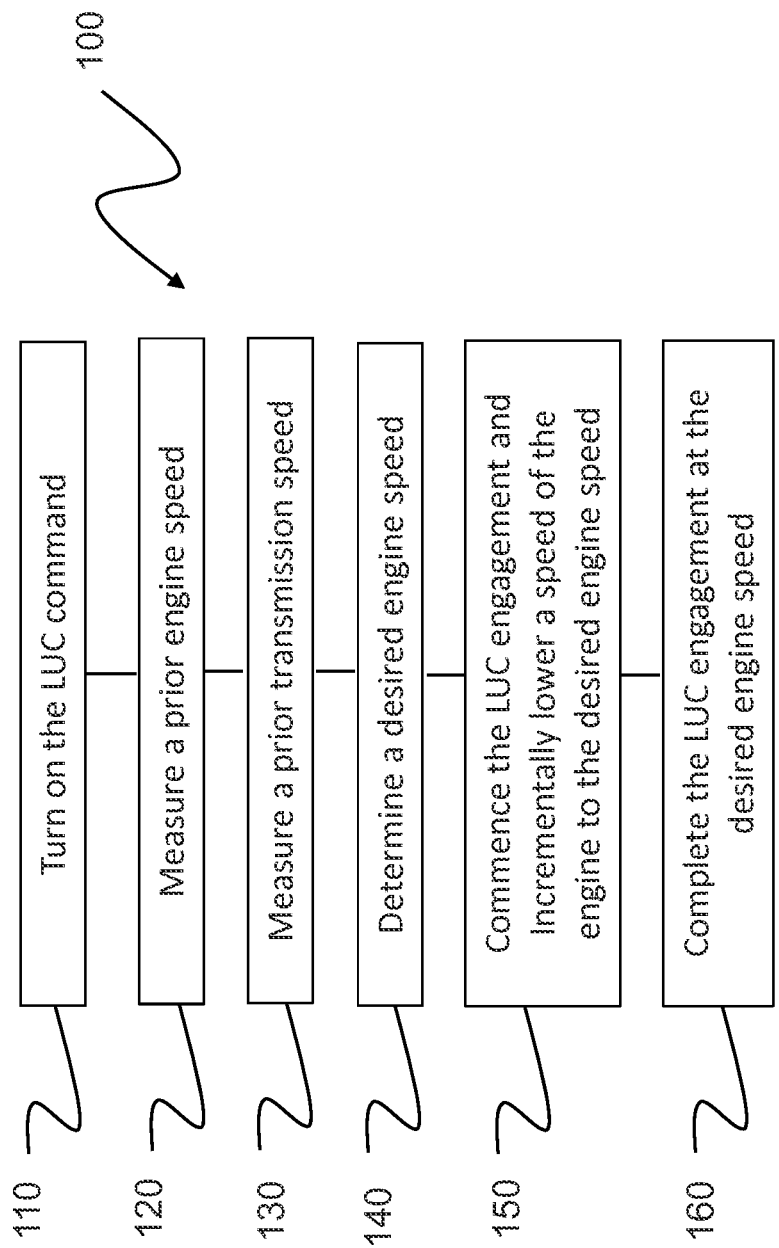
FIG. 3 shows a flow chart showing exemplary steps to control a speed of the engine with respect to a desired engine speed.

FIG. 3 shows a flow chart 100 showing exemplary steps to control a speed of the engine 40 with respect to a desired engine speed. At 110, the ECM 80 may turn on the lock-up clutch command. At 120, a prior engine speed may be measured by an engine speed sensor 41 attached to the engine 40, and the information may be transferred to the ECM 80. At 130, the information about a prior transmission speed may be obtained by transmission sensors 21, 22 and transferred to the ECM 80. At 140, based on the obtained information regarding the prior engine speed and the prior transmission speed, the ECM 80 may determine a desired engine speed for the lock-up clutch engagement. In one aspect, the desired engine speed may be equal to or lower than the prior engine speed. In some aspects, the desired engine speed may be equal to or higher than the prior transmission speed.

Once the ECM 80 determines the desired engine speed, at 150, the ECM 80 may commence the lock-up clutch engagement by incrementally adjusting a speed of the engine 40 to the desired engine speed. In some aspects, the amount of the incremental change in the speed of the engine 40 may be a function of a difference between the prior engine speed and the prior transmission speed. In some aspects, the amount of the incremental change in the speed of the engine 40 may be in a range of about 1% to about 50% of the difference between the prior engine speed and the prior transmission speed. Optionally, the amount of the incremental change in the speed of the engine may be adaptively adjusted as a function of the difference between the prior transmission speed and the prior engine speed. At 160, the lock-up clutch engagement may be complete at the desired engine speed.

In another embodiment, a desired engine speed may be determined as a function of increase in efficiency of the torque converter 50 due to the lock-up clutch engagement. An advantage of using a lock-up clutch mechanism is improving the torque converter efficiency. The torque converter efficiency can be defined by a speed ratio between a transmission speed and an engine speed, a torque ratio between the transmission and the engine, or a product of the speed ratio and the torque ratio. When the lock-up clutch 51 is not engaged, the torque converter efficiency can reach up to 95% or more but less than 100%. When the lock-up clutch 51 is engaged for the direct drive, the torque converter efficiency can reach up to 100%. A desired engine speed may be determined at a speed which is lower than the engine speed measured prior to the lock-up clutch engagement. The amount of decrease in the speed of the engine 40 may be proportional to a projected increased amount of the torque converter efficiency due to the lock-up clutch engagement. In one aspect, a speed of the engine 40 may be incrementally lowered to the desired engine speed as the lock-up clutch moves toward the engagement.

Figure 4:
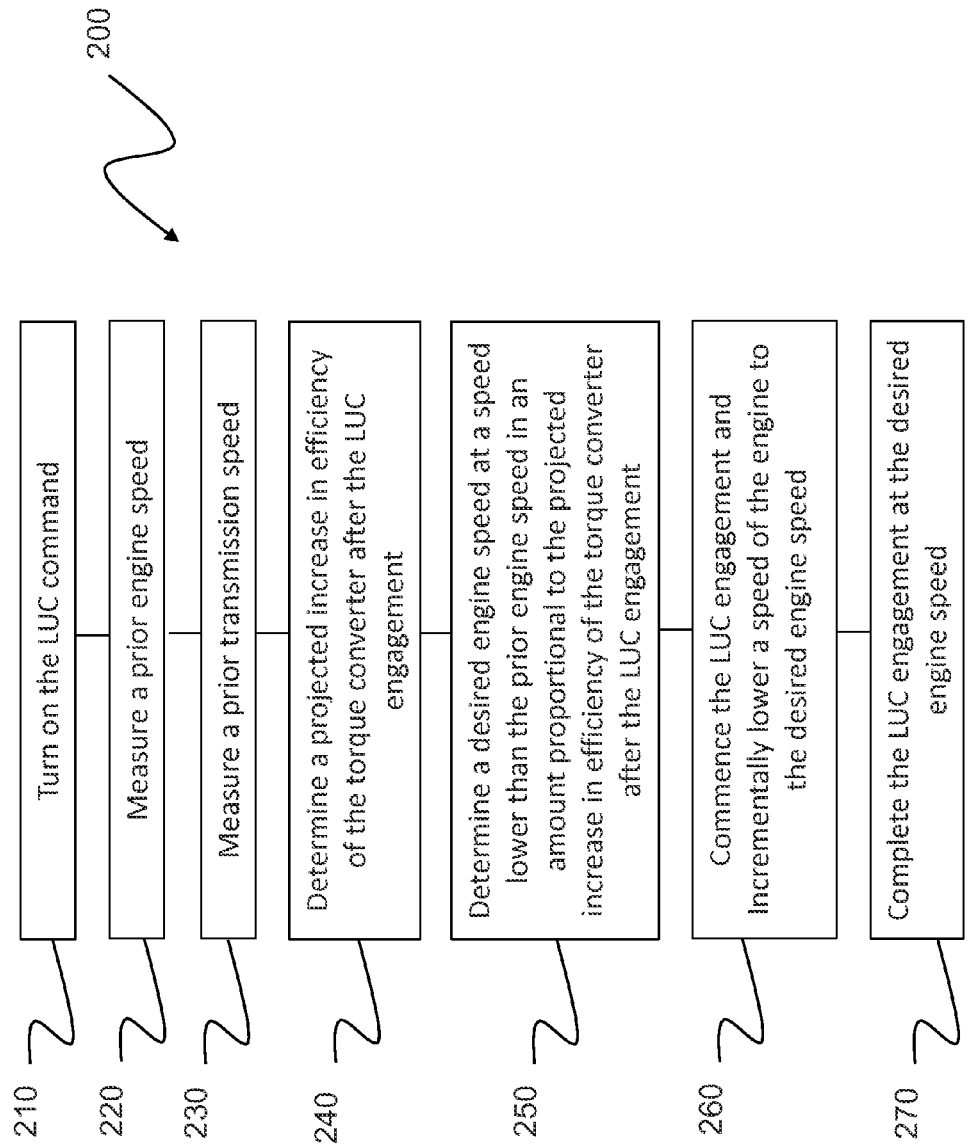
FIG. 4 shows another flow chart showing exemplary steps to control a speed of the engine with respect to torque converter efficiency.

FIG. 4 shows a flow chart 200 showing exemplary steps to control a speed of the engine 40 with respect to the torque converter efficiency. At 210, the ECM 80 may turn on the lock-up clutch command. At 220, a prior engine speed may be measured by an engine speed sensor 41 attached to the engine 40, and the information may be transferred to the ECM 80. Similarly, at 230, the information about a prior transmission speed may be obtained by transmission sensors 21, 22, and transferred to the ECM 80. At 240, based on the obtained information regarding the prior engine speed and the prior transmission speed, the ECM 80 may calculate the torque converter efficiency in the torque converter drive, and determine a projected increase in torque converter efficiency when the torque converter drive is turned to the direct drive. At 250, the ECM 80 may determine a desired engine speed at a speed which is lower than the prior engine speed in an amount proportional to the projected increase in torque converter efficiency due to the lock-up clutch engagement. At 260, the ECM 80 may incrementally lower a speed of the engine to the desired engine speed. Subsequently, at 270, the lock-up clutch engagement may be complete at the desired engine speed.

In another embodiment, when the ECM 80 activates the lock-up clutch 51, the lock-up clutch engagement may be carried out for a transition time. A speed of the engine 40 may be adjusted to a desired engine speed for the transition time as the lock-up clutch 51 moves toward the engagement. In one aspect, the transition time may be adaptively adjusted as a function of a difference between a transmission speed and an engine speed.

Figure 5:
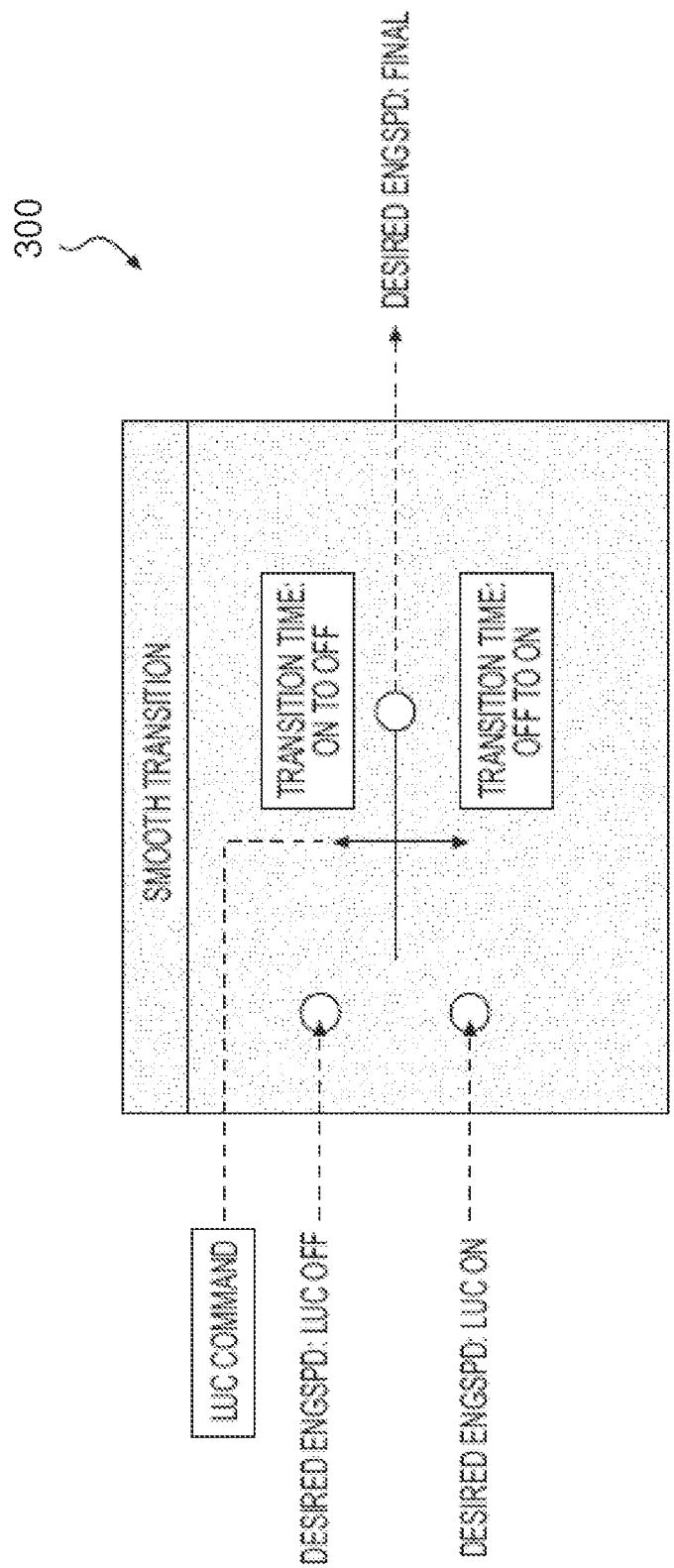
FIG. 5 shows a diagram showing an exemplary lock-up clutch engagement process with respect to a transition time.

FIG. 5 shows a diagram 300 showing an exemplary lock-up clutch engagement process with respect to the transition time. When the ECM 80 activates the lock-up clutch 51, the ECM 80 may determine a transition time to carry out the lock-up clutch engagement. In one aspect, the transition time may be correlated to a desired engine speed. Once the desired engine speed is determined by the ECM 80, a speed of the engine may be incrementally reduced to the desired engine speed for the transition time. In one aspect, the ECM 80 may determine a rate of incremental change of the speed of the engine as a function of the engine speed, the transmission speed, and the desired engine speed. In some aspects, the rate of incremental change of the speed of the engine may remain constant during the lock-up clutch engagement. In various aspects, the ECM 80 may adaptively vary the rate of incremental change of the speed of the engine as the lock-up clutch moves toward the engagement. Optionally, the transition time for the lock-up clutch engagement may be longer than a transition time for the lock-up clutch disengagement. For example, the transition time taken from the commencement to the completion of the lock-up clutch engagement may be in a range of from about $1/100$ sec. to about $1/5$ sec. Preferably, the transition time may be about $1/10$ sec.

INDUSTRIAL APPLICABILITY

The disclosure may be applicable to any engine control system 1 where control of a lock-up clutch 51 is desired. Specifically, the disclosure may be applicable to an electronic control module (ECM) 80 with an internal model that calculates a desired engine speed and adjusts a speed of the engine 40 to the desired engine speed during the engagement of the lock-up clutch 51.

The engine control system 1 may embody a combustion engine 40, such as, for example, a diesel engine, a gasoline engine, a gaseous fuel-powered engine (e.g., a natural gas engine), or any other type of combustion engine known to one skilled in the art. The solenoids 24 may connect an electrical system and a hydraulic system in the engine control system 1.

The transmission 20 may be an automatic transmission. The automatic transmission 20 may have a separate hydraulic system. The automatic transmission 20 may be connected to the transmission controller 10. The transmission controller 10 may be adapted to receive inputs including a vehicle speed signal. In addition, the automatic transmission 20 may be capable of being mechanically connected to the lock-up clutch 51 during operation of the engine control system 1. To control the automatic transmission 20, the transmission controller 10 may include a central processing unit (CPU), a read-only memory (ROM), a random-access memory (RAM) and an interface. The CPU may be configured to process the input signals according to various control programs stored in the ROM for controlling the automatic transmission 20. The transmission controller 10 may be integrated in the ECM 80.

The engine controller 30 may include a microcomputer including a central processing unit (CPU), a read-only memory (ROM), a random-access memory (RAM) and an interface. The engine controller 30 may be configured to receive signals from various sensors 41, 42, such as a mass air flow sensor, a temperature sensor, a Hall effect sensor, a pressure sensor, and an engine speed sensor.

The engine controller 30 may be configured to process the received signals including a desired speed signal, an actual engine signal, and responsively regulate engine speed in a closed-loop controller. In particular, the engine controller 30 may be communicably connected to an engine speed sensor 41 which is adapted to sense an engine speed and produce an engine speed signal. The engine controller 30 may be further connected to an engine temperature sensor which is connected to the engine 40 and produce an engine temperature signal.

The engine controller 30 may process the received signals to regulate the fuel delivery to the engine 40 in response to a difference between a desired engine speed signal and an actual engine speed signal. In one aspect, the engine controller 30 may be adapted to control an engine output according to a command from the transmission controller 10. The engine controller 30 may utilize various speed control strategies. For example, the engine controller 30 may regulate the actual engine speed to correspond with the desired engine speed using proportional-integral-differential (PID) control loop. The engine controller 30 may be integrated in the ECM 80.

The transmission controller 10 and the engine controller 30 may be communicably connected to the ECM 80. The ECM 80 may receive information of the engine control system 1 from a plurality of sensors, 21, 22, 23, 41, 42 to control the torque converter 50 and the transmission 20 by energizing the appropriate solenoids 24.

The ECM 80 may activate the lock-up clutch 51 when direct drive is necessary. When the lock-up clutch 51 is activated, the lock-up clutch 51 may be hydraulically engaged. In one aspect, the lock-up clutch 51 may become a connection between the rotating housing 54 and a transmission shaft 25. The transmission shaft 25 may mechanically connect the torque converter 50 and the transmission 20. The power that is flowing through the torque converter 50 can be hydraulic or mechanical.

The ECM 80 may include an input circuit to perform various functions to process input signals from a plurality of sensors, 21, 22, 23, 41, 42, regulate the voltage levels of the sensors 21, 22, 23, 41, 42, and produce output signals to control the engine 40, the transmission 20 and the lock-up clutch 51. The ECM 80 may be equipped with a central processing unit (CPU), a read-only memory (ROM), a random-access memory (RAM) and an interface. The ROM may store various operating programs which are executed by the CPU, and the RAM may store results of calculations from the CPU. The ECM 80 may further include an output circuit which outputs and delivers output signals to the torque converter 50.

The operating programs may include various engine speed control strategies for the lock-up clutch engagement. In one aspect, the program may configure the ECM 80 to determine a desired engine speed and incrementally lower a speed of the engine 40 to the desired engine speed as the lock-up clutch moves toward the engagement. In some aspects, the program may configure the ECM 80 to determine the desired engine speed at a speed which is lower than the engine speed in an amount proportional to a projected increased amount of the torque converter efficiency due to the lock-up clutch engagement. In various aspects, the program may configure the ECM 80 to determine a transition time necessary for completing the lock-up clutch engagement. Optionally, the program may utilize a combination of those various engine speed control strategies.

The disclosure is universally applicable for use in an ECM 80 for many types of off highway machines, such as, for example, machines associated with industries such as mining, construction, farming, transportation, etc. For example, the machine may be an earth-moving machine, such as a track type tractor, track loader, wheel loader, excavator, dump truck, backhoe, motor grader, material handler, etc. Additionally, one or more implements may be connected to the machine, which may be used for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, moldboards, rippers, scarifiers, shears, snow plows, snow wings, etc. Similarly, the disclosure is universally applicable for use in an electronic control module (ECM) 80 for many types of generator sets that typically include a generator and a prime mover.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An engine control system, comprising:
    a torque converter;
    an engine operatively connected to the torque converter;
    a transmission operatively connected to the torque converter;
    a lock-up clutch housed in the torque converter wherein the lock-up clutch is configured to mechanically connect the engine and the transmission when the lock-up clutch is engaged;
    an engine speed sensor configured to obtain a prior engine speed which is measured prior to engagement of the lock-up clutch;
    a transmission speed sensor configured to obtain a prior transmission speed which is measured prior to the engagement of the lock-up clutch;
    an engine control module configured to:
        determine a desired engine speed at a speed lower than the prior engine speed;
        lower a speed of the engine to the desired engine speed at least one of just prior to the movement of the lock-up clutch and as the lock-up clutch moves toward the engagement; and
        wherein the engine control module is further configured to determine the desired engine speed as a function of increase in efficiency of the torque converter due to the lock-up clutch engagement.

2. The engine control system according to claim 1, wherein the engine control module is further configured to incrementally lower a speed of the engine to the desired engine speed.

3. The engine control system according to claim 1, wherein the engine control module is further configured to adaptively adjust an amount of incremental speed change in the engine as a function of a difference between the prior transmission speed and the prior engine speed.

4. The engine control system according to claim 3, wherein the amount of the incremental speed change is in a range of about 1% to about 50% of the difference between the prior engine speed and the prior transmission speed.

5. The engine control system according to claim 1, wherein the desired engine speed is equal to or higher than the prior transmission speed but lower than the prior engine speed.

6. The engine control system according to claim 1,
    wherein the torque converter efficiency is defined by any of a speed ratio between a transmission speed and an engine speed, a torque ratio between the transmission and the engine, and a product of the speed ratio and the torque ratio, and
    wherein a value of the torque converter efficiency prior to the lock-up clutch engagement is lower than a value of the torque converter efficiency after the lock-up clutch engagement.

7. The engine control system according to claim 6, wherein the lock-up clutch is configured to increase the torque converter efficiency up to 100% when the lock-up clutch is engaged.

8. The engine control system according to claim 6, wherein the engine control module is further configured to determine the desired engine speed at a speed which is lower than the prior engine speed in an amount proportional to a projected increase in torque converter efficiency due to the lock-up clutch engagement.

9. The engine control system according to claim 1, wherein the engine control module is further configured to:
    activate a lock-up engagement command;
    determine a transition time to complete the lock-up clutch engagement; and
    complete the lock-up clutch engagement for the transition time, while adjusting a speed of the engine to the desired engine speed.

10. The engine control system to claim 9, wherein the transition time for completing the lock-up clutch engagement is in a range of from about $\frac{1}{100}$ sec. to about $\frac{1}{5}$ sec.

11. A method for connecting an engine and a transmission via a lock-up clutch in an engine control system, comprising:
    operatively connecting the engine to a torque converter;
    operatively connecting the transmission to the torque converter;
    housing the lock-up clutch in the torque converter;
    configuring the lock-up clutch to mechanically connect the engine and the transmission when the lock-up clutch is engaged;
    measuring a prior engine speed of the engine, via an engine speed sensor, prior to the engagement of the lock-up clutch;
    configuring an engine control module to:
        determine a desired engine speed at a speed lower than the prior engine speed;
        adjust a speed of the engine to the desired engine speed at least one of just prior to the movement of the lock-up clutch and as the lock-up clutch moves toward the engagement; and
        wherein the engine control module is further configured to determine the desired engine speed as a function of increase in efficiency of the torque converter due to the lock-up clutch engagement.

12. The method according to claim 11, further comprising configuring the engine control module to incrementally adjust a speed of the engine to the desired engine speed.

13. The method according to claim 11, further comprising
wherein the torque converter efficiency is defined by any of a speed ratio between a transmission speed and an engine speed, a torque ratio between the transmission and the engine, and a product of the speed ratio and the torque ratio, and wherein a value of the torque converter efficiency prior to the lock-up clutch engagement is lower than a value of the torque converter efficiency after the lock-up clutch engagement.

14. The method according to claim 13, further comprising configuring the lock-up clutch to increase the torque converter efficiency up to 100% when the lock-up clutch is engaged.

15. The method according to claim 13, further comprising configuring the engine control module to determine the desired engine speed at a speed which is lower than the prior engine speed in an amount proportional to a projected increase in torque converter efficiency due to the lock-up clutch engagement.

16. The method according to claim 11, further comprising configuring the engine control module to:

activate a lock-up engagement command;

determine a transition time to complete the lock-up clutch engagement; and complete the lock-up clutch engagement for the transition time, while adjusting a speed of the engine to the desired engine speed.

17. The method according to claim 16, wherein the transition time to complete the lock-up engagement is in a range of from about 1/100 sec. to about 1/5 sec.

18. An apparatus, comprising a torque converter;

an engine operatively connected to the torque converter;

a transmission operatively connected to the torque converter;

a lock-up clutch housed in the torque converter;

means for configuring the lock-up clutch to mechanically connect the engine and the transmission when the lock-up clutch is engaged;

means for obtaining a prior engine speed which is measured prior to engagement of the lock-up clutch;

means for obtaining a prior transmission speed which is measured prior to the engagement of the lock-up clutch;

means for determining a desired engine speed at a speed lower than the prior engine speed;

means for adjusting a speed of the engine to the desired engine speed at least one of just prior to the movement of the lock-up clutch and as the lock-up clutch moves toward the engagement; and means for determining the desired engine speed as a function of increase in efficiency of the torque converter due to the lock-up clutch engagement.

19. The apparatus according to claim 18, further comprising:

wherein the torque converter efficiency is defined by any of a speed ratio between a transmission speed and an engine speed, a torque ratio between the transmission and the engine, and a product of the speed ratio and the torque ratio, and wherein a value of the torque converter efficiency prior to the lock-up clutch engagement is lower than a value of the torque converter efficiency after the lock-up clutch engagement.

20. The apparatus according to claim 18, further comprising:

means for activating a lock-up clutch engagement command;

means for determining a transition time to complete the lock-up clutch engagement; and means for completing the lock-up clutch engagement for the transition time, while adjusting a speed of the engine to the desired engine speed.

* * * * *